US012679765B2

(12) United States Patent
Lewicki et al.

(10) Patent No.: US 12,679,765 B2
(45) Date of Patent: Jul. 14, 2026

(54) SYSTEMS AND METHODS FOR ADDITIVELY MANUFACTURING HIGH STRENGTH AND STIFFNESS FIBER-REINFORCED INORGANIC GLASS COMPOSITE STRUCTURES

(71) Applicant: Lawrence Livermore National Security, LLC, Livermore, CA (US)

(72) Inventors: James Lewicki, Oakland, CA (US); Maxwell Glen Tsurumoto, Modesto, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 295 days.

(21) Appl. No.: 18/199,922

(22) Filed: May 20, 2023

(65) Prior Publication Data

US 2024/0383798 A1 Nov. 21, 2024

(51) Int. Cl.
| | |
|---|---|
| *C03C 14/00* | (2006.01) |
| *B33Y 10/00* | (2015.01) |
| *B33Y 30/00* | (2015.01) |
| *B33Y 70/10* | (2020.01) |
| *C03B 19/01* | (2006.01) |

(52) U.S. Cl.
CPC ............ *C03C 14/002* (2013.01); *B33Y 10/00* (2014.12); *B33Y 30/00* (2014.12); *B33Y 70/10* (2020.01); *C03B 19/01* (2013.01); *C03C 14/004* (2013.01); *C03C 2214/02* (2013.01); *C03C 2214/04* (2013.01); *C03C 2214/06* (2013.01); *C03C 2214/20* (2013.01)

(58) Field of Classification Search
CPC ....... C03C 14/002; B33Y 10/00; B33Y 30/00; B33Y 70/00; B33Y 70/10; C03B 19/025
See application file for complete search history.

(56) References Cited

U.S. PATENT DOCUMENTS 4,464,192 A * 8/1984 Layden ................. C03B 19/025
428/367
9,862,140 B2 1/2018 Lewicki et al.
(Continued)

FOREIGN PATENT DOCUMENTS

KR 20160059302 A 5/2016

OTHER PUBLICATIONS

Corning. "The Secret of Tough Glass: Ion Exchange". [online] [retrieved Jul. 6, 2022]. Retrieved from the Internet using archive. org: https://www.corning.com/worldwide/en/innovation/the-glass-age/science-of-glass/the-secret-of-tough-glass-ion-exchange.html>. (Year: 2022).*

(Continued)

*Primary Examiner* — Erin Snelting
(74) *Attorney, Agent, or Firm* — HARNESS, DICKEY & PIERCE PLC

(57) ABSTRACT

The present disclosure relates to a feedstock for performing additive manufacturing through a heated extrusion print nozzle heated to a working printing temperature. The feedstock may have a glass matrix meltable at the working printing temperature and a reinforcing fiber component. The fiber reinforcing component is disposed within the glass (Continued)

matrix, and selected to be at least one of thermally stable or thermally oxidatively stable at the working printing temperature being used to melt the glass matrix.

14 Claims, 4 Drawing Sheets

(56) References Cited

U.S. PATENT DOCUMENTS

| | | | |
|---|---|---|---|
| 9,944,016 B2 | 4/2018 | Lewicki | |
| 10,173,410 B2 | 1/2019 | Nardiello et al. | |
| 11,084,223 B2 | 8/2021 | Lewicki et al. | |
| 2014/0361460 A1* | 12/2014 | Mark .................... | B29C 64/141 |
| | | | 264/248 |
| 2017/0015060 A1 | 1/2017 | Lewicki et al. | |
| 2018/0243988 A1 | 8/2018 | Lewicki | |
| 2020/0055252 A1 | 2/2020 | Lewicki et al. | |
| 2020/0255660 A1 | 8/2020 | Durand et al. | |
| 2021/0187839 A1 | 6/2021 | Tandy et al. | |
| 2021/0213647 A1 | 7/2021 | Watanabe et al. | |

OTHER PUBLICATIONS

Naeimirad et al. "Fabrication and characterization of silicon carbide/epoxy nanocomposite using silicon carbide nanowhisker and nanoparticle reinforcements". Journal of Composite Materials, 2016, vol. 50(4) 435-446. (Year: 2016).*

Consul et al. Effect of Extrusion Parameters on Short Fiber Alignment in Fused Filament Fabrication. Polymers 2021, 13, 2443. (Year: 2021).*

International Search Report and Written Opinion of the International Searching Authority, issued in PCT/US2024/029023 mailed Feb. 20, 2025; ISA/KR.

Lewicki, James P. et al. 3D-Printing of Meso-structurally Ordered Carbon Fiber/Polymer Composites with Unprecedented Orthotropic Physical Properties, Scientific Reports, (www.nature.com/scientificreports.com) Mar. 6, 2017, pp. 23-36.

Witzendorff, Philipp von et al. Additive manufacturing of glass: CO2 Laser glass deposition printing. ScienceDirect, Procedia CIRP 74 (2018), pp. 272-275.

Felismina, R., et al. "Direct digital manufacturing: a challenge to the artistic glass production." Materials Design and Applicatons (2017): 221-231.

Klein, John et al. "Additive Manufacturing of Optically Transparent Glass," 3D printing and additive manufacturing. Sep. 2015, 2(3): 92-105.

Tredway, William K. Carbon Fiber Reinforced Glass Matrix Composites for Satellite Applications, Final Report Contract No. N00014-89-C-0046 for Department of the Navy office of Naval Research,. United Technologies Research Center East Hartford CT, Oct. 31, 1995.

* cited by examiner

Direct Ink Write (DIW) Printing Method

Filament Melt Deposition

Laser Sintering-based
Continuous Fiber Deposition

SYSTEMS AND METHODS FOR ADDITIVELY MANUFACTURING HIGH STRENGTH AND STIFFNESS FIBER-REINFORCED INORGANIC GLASS COMPOSITE STRUCTURES

FEDERALLY SPONSORED RESEARCH OR DEVELOPMENT

This invention was made with Government support under Contract No. DE-AC52-07NA27344 awarded by the United States Department of Energy. The Government has certain rights in the invention.

FIELD

The present disclosure relates to systems new feedstocks that are well suited for use in additive manufacturing applications, and further to systems and methods for additively manufacturing composite structures, and more particularly to systems and methods for additively manufacturing fiber-reinforced glass composite structures.

BACKGROUND

The statements in this section merely provide background information related to the present disclosure and may not constitute prior art.

Carbon, glass and ceramic fiber matrix composites are typically multiphase composite materials. Typically, the reinforcing phase comprises the fibers, provides high strength and stiffness. The contiguous binding phase, which is primarily responsible for mechanical consolidation and load transfer between fibers, is formed from a polymer material. The polymer material is typically a thermoset or thermoplastic which is orders of magnitude less stiff and strong than the fiber phase.

The fiber phase is therefore primarily responsible for the desirable mechanical properties of the composite, with the polymer phase acting as a communitive medium which can impart some second order properties such as toughness or dielectric permeability. If, however, the comparatively 'weak' polymer contiguous phase is replaced with a high strength, high stiffness, high thermal stability matrix of comparable properties to the fiber(s) used for the fiber phase (e.g., a basic example would be e-glass), then the resultant matrix composite would have both significantly improved overall mechanical and thermal properties versus a traditional fiber-polymer composite. Indeed, examples of such materials, comprising Carbon fibers and a range of differing inorganic glasses as the matrix phases have been manufactured using conventional layup and hot-pressing manufacturing methods (see, e.g., W. K. Tredway, "*Carbon Fiber Reinforced Glass Matrix Composites for Satellite Applications*", Final Report Contract No. N00014-89-C-0046 for Department of the Navy office of Naval Research, United Technologies Research Center, Oct. 31, 1995).

While successfully demonstrating the materials advantages and the feasibility of inorganic glass-carbon fiber composites technology, these extant examples mentioned above are nevertheless limited by all the geometric, post processing, mesoscale fiber directional control and macro-structural complexity limitations of conventional fiber composite manufacture processes (see also, e.g., J. P. Lewicki et al., "*3D-Printing of Meso-structurally Ordered Carbon Fiber/Polymer Composites with Unprecedented Orthotropic*

*Physical Properties*", Scientific Reports (www.nature.com/scientificreports.com), Mar. 6, 2017).

As such, the ultimate potential of fiber-glass matrix composites has not been met. What is needed, therefore, is a range of additive manufacturing systems and methods for the controlled micro extrusion of orthotopic, hybrid and highly ordered carbon-polymer composites, utilizing developments of direct ink write (DIW) technology. Such advancements would enable the production of carbon composite structures with geometric complexity and controlled microstructures heretofore not possible using present day DIW systems and technology.

SUMMARY

This section provides a general summary of the disclosure, and is not a comprehensive disclosure of its full scope or all of its features.

In one aspect the present disclosure relates to a feedstock for performing additive manufacturing through a heated extrusion print nozzle heated to a working printing temperature. The feedstock may comprise a glass matrix meltable at the working printing temperature. The feedstock also may comprise a reinforcing fiber component disposed within the glass matrix, selected to be at least one of thermally stable or thermally oxidatively stable at the working printing temperature being used to melt the glass matrix.

In another aspect the present disclosure relates to a system for additive manufacturing. The system may comprise a computer/electronic controller and a memory in communication with the computer/electronic controller. The memory may be configured to store code in accordance with a 3D part design file needed to build a part in a layer-by-layer fashion. The system may also include a reservoir and a feedstock. The feedstock may contain a quantity of a flowable glass matrix in one of a powdered form, a slurry or a paste, and be contained in the reservoir. The feedstock may also include a reinforcing fiber component at least one of mixed in with, or entrained in, the quantity of flowable glass matrix. The system may also include a print nozzle and a heater. The heater may be configured to heat the print nozzle and the feedstock such that the feedstock is heated to a working temperature sufficient to melt the glass matrix and form a melted feedstock. The reinforcing fiber component is thermally stable at the working temperature, and the print nozzle is configured to receive the mixture of flowable glass matrix with the reinforcing fiber component and to extrude a bead of melted feedstock onto at least one of a substrate or build plate in accordance with the code. The system may also include a motion control subsystem configured to move at least one of the print nozzle, the substrate or the build plate as needed to lay a plurality of the beads of melted feedstock down to form each layer of the part in a layer-by-layer fashion.

In still another aspect the present disclosure relates to a system for additive manufacturing. The system may comprise a computer/electronic controller and a memory in communication with the computer/electronic controller for storing code in accordance with a 3D part design file needed to build a part in a layer-by-layer fashion. The system may also include a feedstock including a consolidated filament of glass and a fiber reinforcing component, and a support component for supporting the feedstock in a manner such that the feedstock can be withdrawn from the support component. The system may also include a print nozzle and a heater for heating the print nozzle and the feedstock, such that the feedstock is heated to a working temperature sufficient to melt the consolidated filament of glass as the feedstock passes through the print nozzle, and wherein the fiber reinforcing component is stable at the working temperature. The print nozzle is configured to receive the mixture of flowable glass matrix with the reinforcing fibers mixed therein and to extrude a bead of melted feedstock onto at least one of a substrate or build plate in accordance with the code. The system may also include a motion control subsystem for moving at least one of the print nozzle, the substrate or the build plate as needed to form each layer of the part in a layer-by-layer fashion.

In still another aspect the present disclosure relates to a method for additively manufacturing a part. The method may comprise providing a 3D part design file needed to build a part in a layer-by-layer fashion, and feeding a feedstock to a heated print nozzle. The feedstock includes a glass matrix or a consolidated glass, in addition to a reinforcing fiber component, and the feedstock further is in a form of at least one of a flowable mixture or a filament. The reinforcing component includes at least one of a continuous reinforcing fiber tow, a continuous reinforcing fiber tape, a continuous reinforcing fiber braid, a plurality of chopped fibers, or a plurality of milled fibers. The method may further include using a heated print nozzle heated to a predetermined temperature to melt the feedstock as the feedstock is fed into the print nozzle, and to extrude a melted bead of the feedstock onto a build plate. The method may further include moving one of the print nozzle or the build plate relative to the other as needed to lay a plurality of the beads of melted feedstock down to form each layer of the part in a layer-by-layer fashion.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

The present disclosure broadly relates to new techniques of 3D printing aligned carbon fiber composites and melt-3D printing of glasses in a manner which enables 3D printing with one or more of controlled microstructure, fiber alignment, complex geometries and advanced second order composite properties. The present disclosure thus discloses a new class of additively manufactured fiber-glass composites which are expected to enable the manufacture of a wide variety of different types of parts have engineered properties, which heretofore have not been possible using traditional 3D printing systems and methods. The new systems and methods of manufacture of fiber reinforced inorganic glass composites described herein combine the favorable mechanical and thermal properties of both high-performance fiber and glass phases, to yield a composite material that is both more thermally stable and mechanically advantageous then equivalent fiber-organic polymer matrix composites. Composite manufacture may be achieved via one or more different additive manufacturing processes, along with thermal processing of a mixed fiber-glass feedstock, to deposit and consolidate the glass matrix around directionally aligned fibers (either short or continuous), to additively build a 2D or 3D structure or part onto a substrate or build plate. A range of additives such as, but not limited to, inorganic metal salts, nano-micro-particles, platelets, hollow spheres, tubes or whiskers may be added to the glass-fiber feedstock to further moderate, tune or enhance the thermal, electrical, or mechanical properties of the contiguous glass phase as well as delivering additional physical or chemical functionality to the composite.

3D DIW Printing System Overview

Figure 1:
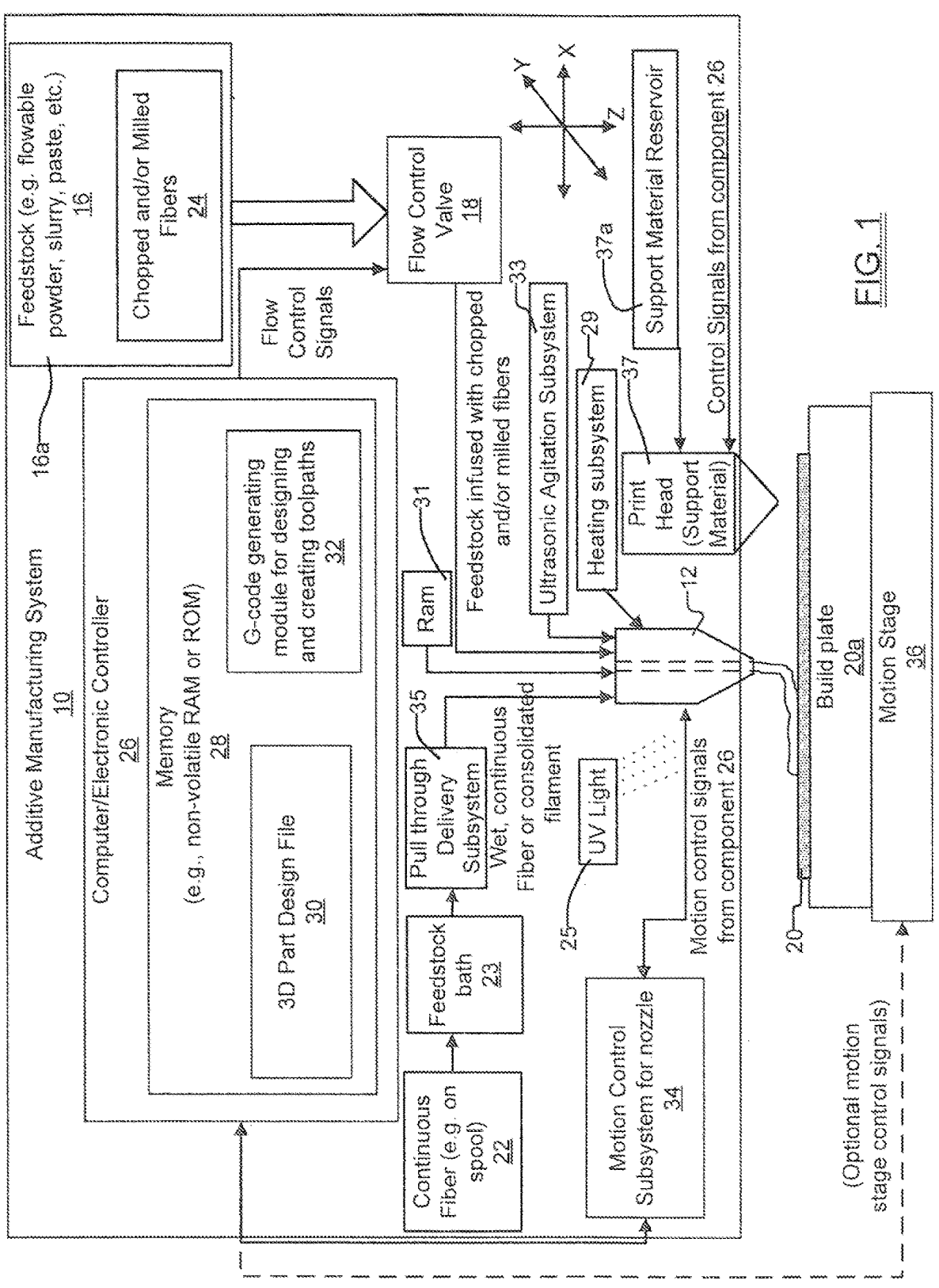
FIG. 1 is a high level block diagram showing one embodiment of a Direct Ink Write ("DIW") additive manufacturing system in accordance with the present disclosure.

Referring now to FIG. 1, there is shown one example of an additive manufacturing system 10 that may be used in carrying out one or more the additive manufacturing methods to be described in the present disclosure. The system 10 in this embodiment forms a "Direct Ink Write" ("DIW") system in which a flowable feedstock 16, supplied from a reservoir 16a, is used to make a 3D part in a layer-by-layer fashion. The feedstock 16 is supplied to a print head, in one example a 5-axis print nozzle component 12, and extruded from the nozzle component 12 as a bead having a desired 3D shape depending on the configuration of a tip of the nozzle component. The flow of the feedstock 16 may be controlled by flow control valve 18, in one implementation via received flow control signals, to regulate the rate of flow to the nozzle component 12. The feedstock 16 may be printed directly on a UV curable, sacrificial support material 20 which is present on a build plate 20a. In one embodiment the feedstock may be formed in part a continuous fiber 22 and/or chopped or milled fibers 24. In one embodiment the chopped or milled fibers 24 may be mixed with a glass matrix to form the feedstock 16, and the mixture may be injected into the nozzle component 12. In the various embodiments described herein the fiber reinforcing component of the feedstock 16 provides selective fiber reinforcement to all or just select portions of each layer of the printed part. As noted above, if chopped and/or milled fibers 24 are used, they may be mixed into the feedstock 16 and supplied to one input port of the nozzle component 12. If the continuous fiber 22 is used, this may be passed through a feedstock bath formed by, for example, a slurry or paste 23, to provide a wet, continuous fiber that is fed into the nozzle component 12. Alternatively, a second nozzle (not shown) may be coupled or slaved to the nozzle component 12 for supplying the continuous fiber 22, and such that the second nozzle moves with the nozzle component 12.

The reinforcing fibers 22 and/or 24 may be laid down with the feedstock 16 in discrete, engineered toolpaths with a high degree of alignment in the direction of printing. By "engineered" it means toolpaths that have been determined to impart and/or enhance a desired performance (e.g., structural, thermal, conductive, etc.) characteristic of the final printed 3D part. The final printed structure is multi-layer, 3D arrangement of these toolpaths generated from G-code, controlling the nozzle component 12, where the toolpaths have been sourced from a stored toolpath planning and design algorithm. The feedstock 16 (with one or both of the chopped/milled fibers 24 or continuous fiber 22) may be extruded from the printing nozzle component 12 and used to form each layer of a structure or part, in a layer-by-layer process, starting with an initial layer deposited on the sacrificial support material 20. Optionally, one or more ultraviolet ("UV") lights 25 may be used to project UV light onto the just-deposited feedstock 16 to UV cure the feedstock virtually immediately after it is laid down. The UV light 25 may be secured or slaved to the nozzle component 12 so as to move with the nozzle component 12. Alternatively, the UV light 25 may be stationary with a beam sufficient to illuminate the entire build plate 20a at once.

As noted above, the present technology provides methods by which AM feedstocks, sometimes referred to as "inks", are partially cured during deposition so as to provide sufficient structural integrity to the printed part while allowing molecular diffusion across layers of deposited materials and layer-layer covalent consolidation, due to the partial nature of the curing and network formation. Accordingly, UV lights 25 may be located proximate to nozzle component 12 so as to facilitate such partial curing selectively to the layer of feedstock 16 being printed, it being understood that optimal partial gelation of the AM feedstock will be affected by a variety of variables understood to one in the art, including composition of the AM feedstock (e.g., resin system and catalyst loading), UV flux, UV wavelength, irradiation time/print speed, and extrusion speed. At least partial gelation upon printing may also be accomplished using an external heating source (not shown) to provide heat to the just-extruded feedstock 16.

It will also be appreciated that the following discussion may refer to the article being formed at various stages of the new manufacturing processes described herein as a "component", a "part", a "cured part" or as a "structure", with it being understood that these terms denote a 3D article, and that these terms may in some instances be used interchangeably.

Referring further to FIG. 1, the system 10 may include an electronic controller 26 having a non-volatile memory 28 (e.g., RAM and/or ROM). The memory 28 may form an integrated portion of the electronic controller 26 or may be a separate component in communication with the electronic controller. The memory 30 may include one or more 3D CAD part design files 30 that are needed to form each layer of the part in a layer-by-layer printing operation. The memory 28 may also include a G-code generating module 32 having one or more algorithms for designing and generating specific toolpaths in accordance with desired input engineering parameters specific to a given part, for each layer of the part. Again, these engineering parameters may be, without limitation, to impart or enhance a mechanical property such as structural strength, stiffness or toughness of a portion of the part. Such engineered parameters may also optionally include selectively weakening one or more specific areas; or imparting or enhancing a thermal/thermomechanical property such as a thermal conductivity, a tailored coefficient of thermal expansion, or to limit or otherwise control thermal contraction and stress concentration on cure and subsequent pyrolysis. These are but a few features that may be introduced into the finished part. Various combinations of the above-mentioned engineered properties may also be selectively chosen to provide a highly selectively engineered part well suited for specific uses.

The system 10 may also include a motion control subsystem 34 for controlling movement of the nozzle 12, assuming the build plate 20a is held stationary during the formation of each layer of the part. In some embodiments a motion stage 36 may be incorporated instead of, or in addition to, the motion control subsystem 34, for moving the entire build plate 20a along X and Y axes, for example through the control of independent X and Y axis motors associated with the motion stage 36, while the nozzle component 12 is held stationary. In some embodiments both the motion stage 36 and the motion control subsystem 34 may be used together. It is anticipated that in many applications, however, movement of the nozzle component 12 will be preferred while the build plate 20a is held stationary.

Referring further to FIG. 1, in some embodiments the system 10 may include a heating subsystem 29 for heating the nozzle 12 to a predetermined temperature, a ram (e.g., screw ram) 31 for forcing the feedstock material 16 into and through the nozzle 12, and/or an ultrasonic agitation subsystem 33 for agitating the feedstock material as the feedstock material is being extruded out from the nozzle 12. The nozzle 12 may be heated to a working temperature sufficient to melt the glass matrix or the glass consolidated material of the feedstock 16, for example a temperature typically within the range of 300-1800° C. In some embodiments a pull through delivery subsystem 35 may be included for pulling the continuous fiber or a physical braided filament, or even tape, through the feedstock bath 23 and assisting in feeding a feedstock matrix entrained fiber or braided filament into the nozzle 12. In some embodiments the nozzle 12 may be made from a heat refractory material. Each of the heating subsystem, the ram 31 and the ultrasonic agitation subsystem 33 may be controlled by suitable control signals received from the computer/electronic controller 26. Control of these components/subsystems may be carried out using an open loop control scheme (e.g., utilizing data tables stored in the memory 28 such as look-up tables) or in a closed loop fashion by providing feedback signals from the subsystems 29 and 33, as well as the ram 31, back to the computer/electronic controller 26. The applicability of various ones of these subsystems will be discussed in the following paragraphs as they pertain to specific methods and embodiments of the present disclosure. It will also be appreciated that the teachings of one or more of U.S. Pat. No. 9,944,016 to Lewicki, issued Apr. 17, 2018, U.S. Patent Pub. No. 2018/0243988 A1, published Aug. 30, 2018 and U.S. Pat. No. 11,084,223 to Lewicki et al., issued Aug. 10, 2021, which are all hereby incorporated by reference into the present disclosure, may potentially be integrated into the system 10.

Feedstock Preparation

The following discussion will focus on new feedstocks that may be used with the above-described system 10, as well as potentially other types of additive manufacturing systems. In general, however, the feedstock 16 in various forms comprises new physical combinations or mixtures of a glass matrix material and a reinforcing fiber component or components, or a consolidated glass with a reinforcing fiber component or components. In one embodiment the feedstock 16 may be a mixture formed by a powder of a glass mixed with short (chopped or milled fibers), or alternatively a loose glass powder which physically entrains a continuous tow of fibers. In another embodiment of the feedstock 16 a glass powder(s) may be stabilized or partially consolidated with low levels of an organic or inorganic binder (such as, but not limited to, a polyolefin or sodium metasilicate), and in another embodiment may be further modified with flowing and anti-clumping agents such as, but not limited to, sodium stearate. In still another embodiment the reinforcing fiber component may be formed as a stabilized tape, braid or other combination of continuous glass and reinforcing fibers.

In another form the fiber reinforcing component of the feedstock material 16 may be formed using a continuous fiber 22 and feedstock bath 23. In still another embodiment the reinforcing fiber component may be comprised of a short fiber dispersion or continuous fiber filament tow (e.g., using continuous fiber 22) that is fully entrained within a consolidated glass filament. In one form the continuous glass filament may have been prepared though a die extrusion process, such as, for example, through a twin-screw hot melt filament extrusion process. In some or all embodiments of the feedstock 16, the fiber volume fraction of the fiber reinforcing component can comprise between 0 and 60 volume % of the feedstock. In some or all embodiments of the feedstock 16 nano and micro filler additives such, as but not limited, to SiC nanowhiskers, BN nanofibers, ceramic hollow spheres, diamond grit microparticles, etc., may be added to the feedstock mixture 16 to add additional properties to the final printed composite.

Matrix and Fiber Reinforcement Materials Selection

The reinforcing fiber selected for use as the fiber reinforcing component of the feedstock 16 may be any one of several commercially available or custom manufactured microfibers. Such reinforcing fibers may include, but are not limited to, carbon fibers (e.g., Pitch-based carbon fiber, polyacrylonitrile (PAN) based carbon fiber, Viscose rayon based carbon fiber, etc., in various stages of graphitization), boron nitride (BN) fibers, silicon carbide (SiC) fibers or refractory metal/metal ceramic microfibers. The fiber selected for use in also preferably thermally stable, and potentially thermo-oxidatively stable, over the processing (including printing and annealing) temperatures of the Glass matrix in each process. For example, a compatible composition would be a high stiffness Pitch-based coal tar derived carbon fiber in an alumina borosilicate glass matrix (melt-process temperature ~1725° C., which is significantly below the degradation temperature of a typical pitch carbon fiber). The glass matrix material of the feedstock 16, in some embodiments, may be any inorganic silica-based glass composition from a simple soda-lime glass, and in some embodiments may be one or more different borosilicate glasses including, but not limited to, e-glass, s-glass, m-glass or even a pure quartz glass. In some embodiments the glass feedstocks may also be toughened by ion-exchange processes.

Extrusion Based Deposition Methods
1) Direct Ink Write Print Method

A plurality of extrusion based deposition methods are possible for depositing the feedstock 16 described herein. A first extrusion based deposition method is the direct powder melt and write method (i.e., essentially a DIW method). With this method of deposition, the printing (i.e., melting, deposition consolidation, and structure formation process) may be achieved through a micro extrusion and multi axis motion controller process where a deposition head (e.g., print nozzle 12 in FIG. 1) is positioned by the computer/electronic controller via G-code control and the feedstock is extruded onto a substrate in accordance with a stored (e.g., from the 3D part design file 30 in FIG. 1). The CAD file enables the system 10 (FIG. 1) to produce a 3D part, layer-by-layer, with desired predetermined toolpaths, in accordance with the CAD file. In one embodiment the feedstock may be a short fiber/glass powder mix, and in another embodiment may be a physical braid/tape of continuous fiber and glass fiber or a continuous fiber, fed through a glass powder mixture. The feedstock material may be conveyed through a hopper arrangement (e.g., material reservoir 16a in FIG. 1), or using drive rollers and/or through pull delivery such as continuous fiber on spool 22 in FIG. 1 for continuous fibers, to a tapered, heated nozzle (e.g., nozzle 12). In this embodiment the nozzle 12 may be formed from a refractory material. The nozzle 12 may be heated to the processing temperature of the glass in the feedstock 16. For short fiber/powder compositions the feedstock 16 may be pushed through the nozzle 12 by a mechanical impetus such as a screw ram (e.g., ram 31 in FIG. 1), and melts/softens in the nozzle to allow extrusion from a tip 12a of the nozzle 12. The fiber volume fraction, nozzle diameter and taper may be optimized such that the short fibers align during extrusion and the extruded bead contains fibers constrained within consolidated glass that have preferentially aligned in the direction of extrusion. In the case of a continuous fiber/powder glass system or a fiber/glass fiber braid/tape system, the fibers are pre-aligned and in the case of the braid/tape there is no requirement for the screw driven ram. Rather, an arrangement of rollers, guides and drives may be used (e.g., as in a tape placement compaction system) to deliver the extrudate to the substrate. In all cases the motion of the nozzle (or the substrate relative to the nozzle) in at least three axes is required to build a 3D structure. In all cases the cooling of the feedstock 16, in this example an extruded glass matrix, to a temperature below its softening point is required to occur within the printing timeframe to allow high resolution, free-standing 3D structures to be fabricated. In all cases a second print head 37 may optionally be employed to deposit a support material from a support material reservoir 37a on or adjacent to the extruded glass matrix feedstock 16. This optional support material may be comprised of a material which is thermally stable over the process temperatures but which dissolvable on post processing (such as, for example, a sodium metasilicate based cement).

Direct Ink Write (DIW) Print Method

Figure 2:
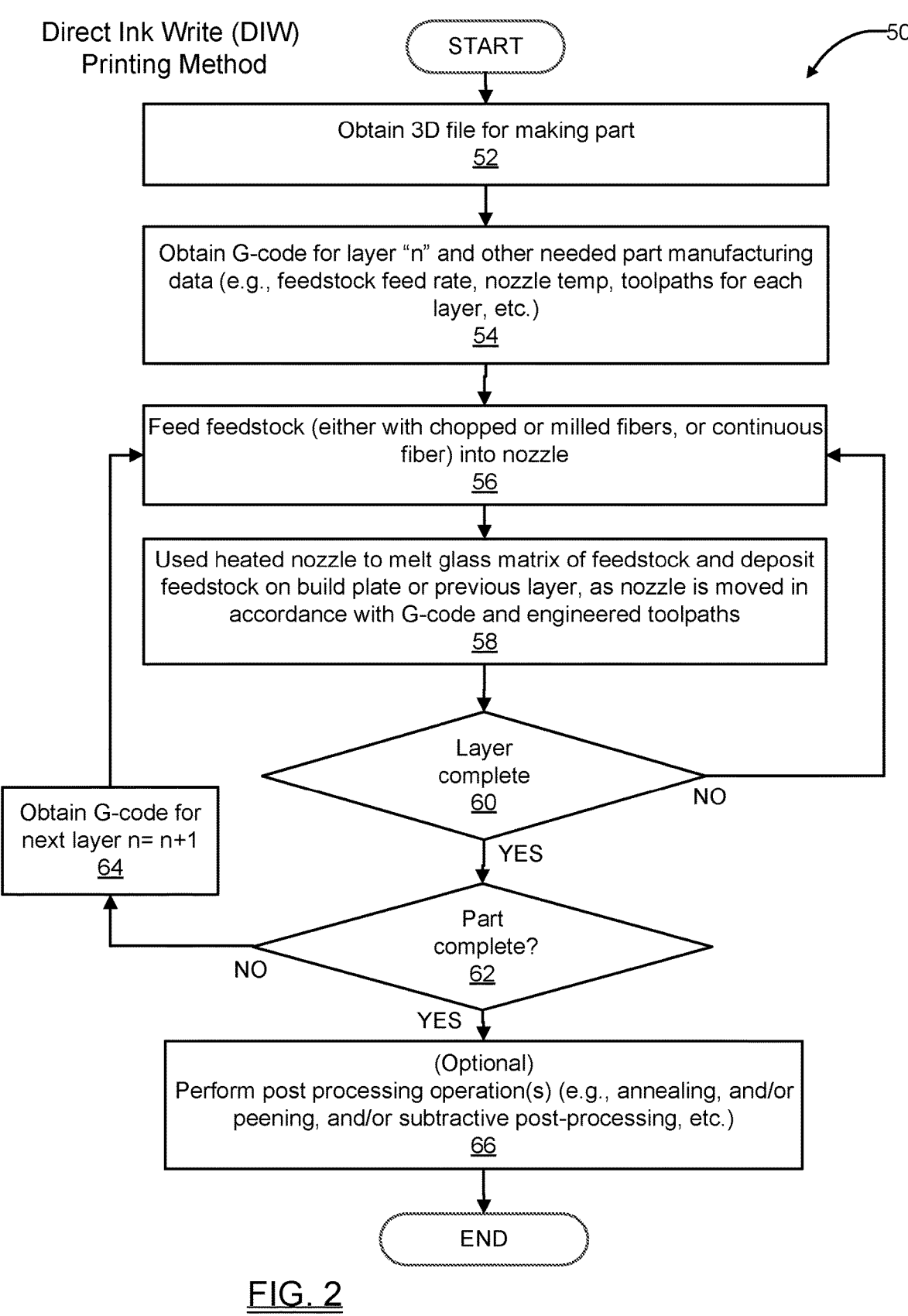
FIG. 2 is a high level flowchart illustrating one example of various operations that may be performed in carrying out a DIW additive manufacturing operation in accordance with the present disclosure.

FIG. 2 shows a flowchart 50 illustrating one specific example of operations that may be carried out with a DIW printing method in accordance with the present disclosure is provided. With the DIW print method, the feedstock 16 is preprocessed to form a glass matrix with either chopped or continuous reinforcing fibers, or possibly both, as described above. The glass matrix of the feedstock 16 may be in the form of, for example and without limitation, a powder, a slurry, a paste or other form such as a flowable powder which is able to be extruded using the print nozzle 12. If a continuous fiber is used, then the continuous fiber may be wound onto a reel or carriage such as shown in FIG. 1 with component 22. Mechanical feed rollers and/or the pull through delivery subsystem 35 may be used to feed the feedstock 16 into the nozzle 12. The feedstock 16 may be melted and extruded on the substrate 20 using the print nozzle 12 in a reduced diameter bead, in a layer-by-layer process, to form a 3D structure. In all extrusion based methods such as the DIW method described herein, mechanical push through methods, and/or ultrasonic agitation of the nozzle under a resonance condition (e.g., using the ultrasonic agitation subsystem 33 in FIG. 1) may also be employed to reduce wall friction and increase effective flow rate through the nozzle 12 at a given process temperature and mechanical load condition.

With specific regard to the flowchart 50 of FIG. 2, the DIW method initially involves obtaining a 3D file for making the structure or part, as indicated at operation 52. At operation 54 the G-code needed for making the initial layer "n", as well as other needed part manufacturing data (e.g., feedstock feed rate, nozzle temp, etc.) is obtained by the computer/electronic controller 26. At operation 56 the feedstock, which may be a glass matrix with either chopped or continuous fibers, or both, is fed to the print nozzle (e.g., nozzle 12 in FIG. 1). The nozzle 12 may be heated to melt the glass matrix component thereof and to extrude the melted feedstock onto the build plate (e.g., component 20a in FIG. 1) as the nozzle and/or the build plate are moved relative to another, in accordance with the G-code, as indicated at operation 58. A check may then be made if the present layer is complete, as indicated at operation 60, and if not, the printing process continues with operations 56 and 58 being repeated in a seamless manner.

When the check at operation 60 indicates the layer is complete, then a check is made if the part is complete, as indicated at operation 62. If the check at operation 62 indicates that the part is not complete, then the G-code needed (including toolpaths) for printing the next layer (i.e., layer n=n+1) is obtained by the computer/electronic controller 26, as indicated by operation 64, and operations 56-60 are repeated to print the next layer of the part. When the check at operation 62 indicates the part is complete, then any post processing operations (optional) may be performed such as one or more of annealing, peening, subtractive processing, etc., as indicated at operation 66.

Filament Melt Deposition Print Method

Figure 3:
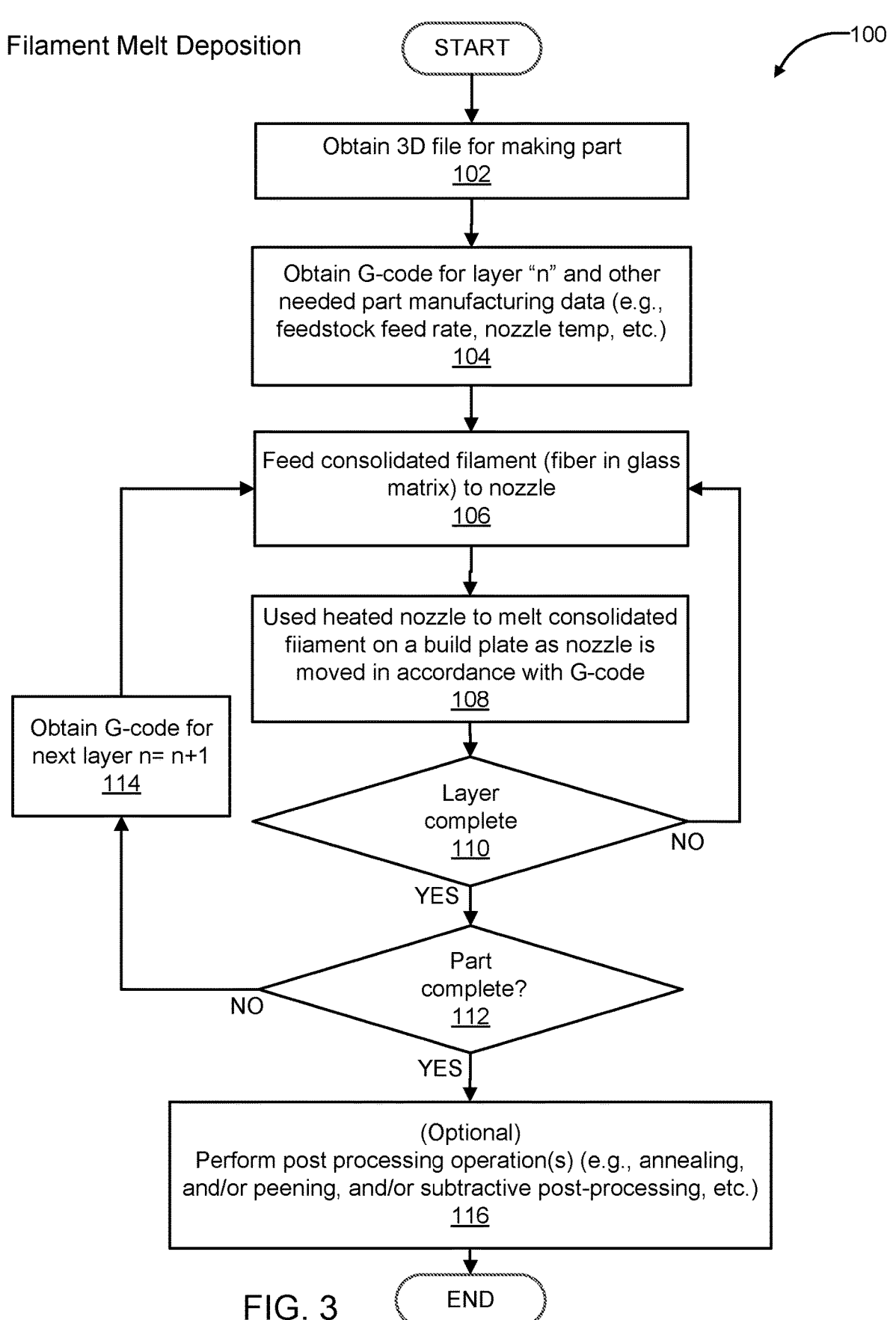
FIG. 3 is a high level flowchart illustrating one example of various operations that may be performed in carrying out a filament melt deposition additive manufacturing operation in accordance with the present disclosure.

Referring to FIG. 3, a flowchart 100 illustrating one example of a filament melt deposition method in accordance with the present disclosure is provided. With a filament melt deposition method, the feedstock is preprocessed into a consolidated filament of glass and short fibers, or glass and a continuous fiber (or both), and wound onto a reel or carriage. Mechanical feed rollers may be used to help feed the bulk filament into the print nozzle 12, which in one embodiment may be a ceramic print nozzle. The feedstock may be melted and extruded on the substrate in a reduced diameter bead to form a 3D part or structure in a process that is superficially identical to fused deposition modeling, with the major difference being the use of increased temperatures and a fiber loaded glass feedstock. In all extrusion based mechanical push through methods, ultrasonic agitation of the nozzle 12 under a resonance condition (e.g., using the ultrasonic agitation subsystem 33 in FIG. 1) may be employed to reduce wall friction and increase effective flow rate through the nozzle at a given process temperature and mechanical load condition.

One non-limiting example of specific various operations associated with the above manufacturing method is shown in the example flowchart 100 of FIG. 3, which initially involves several operations similar or identical to those described in flowchart 50. These operations involve obtaining a 3D file for making the structure or part, as indicated at operation 102. At operation 104 the G-code needed for making the initial layer "n", as well as other needed part manufacturing data (e.g., feedstock feed rate, nozzle temp, engineered toolpaths, etc.) is obtained by the computer/electronic controller 26. At operation 106 the feedstock, which may be a consolidated filament (e.g., fiber in consolidated glass matrix) is fed to the print nozzle (e.g., nozzle 12 in FIG. 1). The nozzle may be heated to melt the consolidated filament onto the build plate (e.g., component 20a in FIG. 1) as the nozzle and/or the build plate are moved relative to another, in accordance with the G-code (including engineered toolpaths, as indicated at operation 108. A check may then be made if the present layer is complete, as indicated at operation 110, and if not, the printing process continues with operations 106 and 108 being repeated in a seamless manner.

When the check at operation 110 indicates the layer is complete, then a check is made if the part is complete, as indicated at operation 112. If the check at operation 112 indicates the part is not complete, then the G-code needed for printing the next layer (i.e., layer n=n+1) is obtained by the computer/electronic controller 26, as indicated by operation 114, and operations 106-110 are repeated to print the next layer of the structure/part. When the check at operation 112 indicates the part is complete, then any post processing operations (optional) may be performed such as one or more of annealing, peening, subtractive processing, etc., as indicated at operation 116.

Laser Sintering-Based Continuous Fiber Deposition Methods

Figure 4:
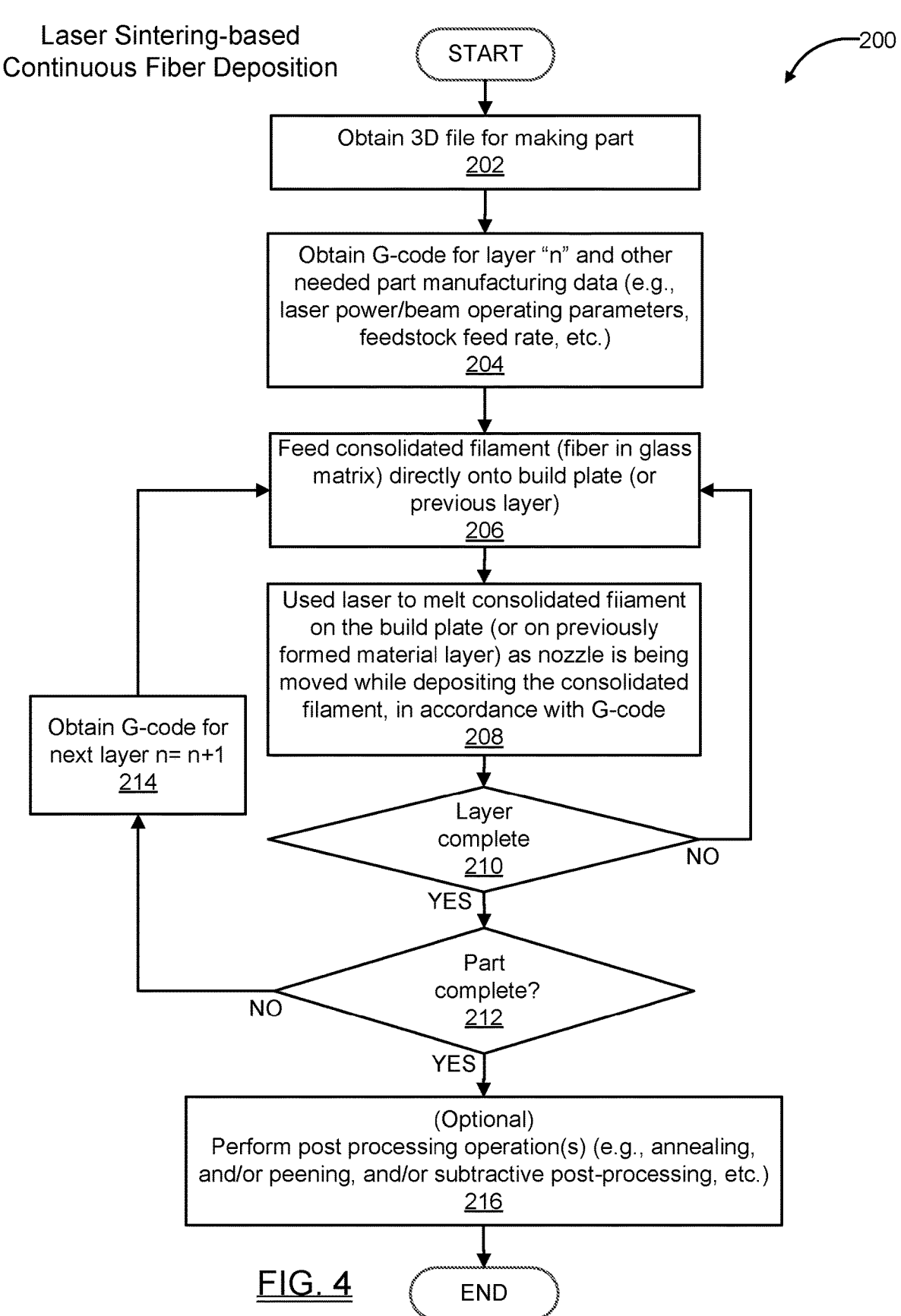
FIG. 4 is a high level flowchart illustrating one example of various operations that may be performed in carrying out a laser sintering-based continuous fiber deposition additive manufacturing operation in accordance with the present disclosure.

With laser sintering-based continuous fiber deposition systems and methods, the deposition system is analogous to a polymer composite fiber tape placement system. The deposition system deposits a tow of fiber/glass fiber tape/braid on a substrate which is immediately melted to consolidation by a laser light source, for example and without limitation, a $CO_2$ laser, to form a structure or part. One example of this manufacturing method is shown in greater detail in the example flowchart 200 of FIG. 4. With this method the 3D data needed for manufacturing a structure/part is obtained as indicated at operation 202. At operation 204 the G-code (including engineered toolpaths) needed for manufacturing the initial layer (layer "n") of the structure or part is obtained by the computer/electronic controller 26, along with any other manufacturing parameters needed (e.g., laser parameters such as beam power, beam wavelength, beam repetition frequency, etc., as well as feedstock feed rate, etc.). At operation 206 the feedstock material, in this example a consolidated filament (e.g., fiber tow in glass matrix) is deposited directly onto the build plate (or on the previously formed layer). At operation 208 a laser, in one example a $CO_2$ laser, is used to melt the consolidated filament on the build plate (or on the previously formed material layer), as the nozzle is being moved while depositing the consolidated filament, in accordance with the G-code and the engineered toolpaths. At operation 210 a check is made to determine if the present layer is complete, and if not, operations 206 and 208 are repeated to continuing the printing operating in a seamless manner. If the check at operation 210 indicates that the layer is complete, then a check is made at operation 212 if the part is complete, and if not, then at operation 214 the G-code (including engineered toolpaths) for forming the next layer (i.e., layer n=n+1) is obtained by the computer/electronic controller 26 and operations 206-212 are repeated. When the check at operation 212 indicates that the part is complete, then one or more optional post-processing operations (e.g., annealing, peening, subtractive manufacturing, etc.) may be performed on the part, as indicated by operation 216.

Powder Bed Fusion Method

With the powder fed fusion system and method, a glass powder/short fiber feedstock mixture is prepared and placed in a bed. The bed may be supported on the build plate 20a shown in FIG. 1. The bed may be moved either up or down along the in Z axis with an arrangement to re-coat the just-fused layer of feedstock material with a new layer of feedstock material. A single layer of the 3D structure being printed is printed by rastering an optical beam from laser source, or optionally a projection of a laser image, onto the bed. In either event, the laser beam or image melts the glass and consolidates the fiber of the feedstock material. The bed is reset (e.g., possibly adjusted along the Z axis), and the next layer of feedstock material is placed over the previously formed layer, and then written using the laser. The part is formed in a layer-by-layer process as each new layer of feedstock material is deposited on the previously formed layer and fused using the laser.

Toolpath and Geometric Design Optimization

In all embodiments, to a lessor or greater extent depending on the specific form of deposition used and the structure or part being formed, computational design optimization and toolpath planning algorithm approaches may be employed in the design of the component and component microstructure to optimize the structure's performance characteristics and physical properties. In each embodiment/method described above, the CAD file for the component or part, in combination with the desired requirements for optimization (e.g., strength, stiffness, conductivity, CTE, in a given sub-volume, axes, layer or zone of the part) is/are processed through computational design optimizer tools. Such computational design optimizer/optimization tools may include, for example and without limitation, a level set traveling salesman optimizer as disclosed in U.S. Pat. No. 11,084,223 to Lewicki et al., issued Aug. 10, 2021, which has been incorporated by reference into the present disclosure. This optimization may yield a mathematical geometry and directional fiber micro structure which is a solution to the required property optimization posed for the structure or part. This solution set may be even further processed through a toolpath planning algorithm which applies a series of practical printability constraints derived from the print platform and materials limitations, to yield G-code which retains the original benefits of the mathematical optimization of the CAD.

Annealing and Post Processing

In all of the above-discussed systems and methods, the part post-printing may be thermally annealed to remove/reduce residual stresses on the part prior to final use. It is anticipated that annealing will be required or highly desired when using most, or all, of the above-described printing processes. An annealing process may be conducted while the part is still indexed on the substrate (or build plate 20*a*), or optionally carried out at a remote location or workstation after removal from the substrate or build plate. In all cases involving post annealing, the part may also be subtractively post-processed to improve surface finish or to input/create additional geometric features for the structure or part. Subtractive post processing may be in the form of, for example and without limitation, laser or chemical etching, or by mechanical abrasion/polishing, or by lathe cutting operations, or by means of 3-7 axis CNC milling operations. All post-processing operations may be conducted while the part is still indexed on the substrate (e.g., and without limitation, by means of additional tool heads/arms on the motion control stage) or conducted remotely. In all cases the annealing and post processing operations, when conducted on the structure or part in its original printed configuration, provide the advantage of no additional indexing or setup, as well as the ability to control the process using the common stage (e.g., build plate 20*a*), such that the system 10 will be aware of the location of the structure or part in 3D space at all times during the post-processing operation(s). In this embodiment a complete part may be fabricated (e.g., printing, annealing, and further subtractive post-processing) in what is a multi-tool/single step manufacturing process carried out without physically removing the part or structure from the build plate. However, this approach may involve additional cost and complexity for the printing platform needed, which may potentially require one or more of additional print heads/arms, control interfaces, radiant heating systems, and/or dust/waste management hardware.

The teachings presented herein enable a wide variety of characteristics/properties to be imparted to additively manufactured structures and parts, for example without limitation, high stiffness, low CTE and/or high strength, lightweight structural mounts, inserts, members, or fixtures. Thermally resilient high strength and stiffness coatings or cases may also be formed using the teachings of the present disclosure. It is expected that the teachings presented herein will find particular utility in creating structures, components and parts for aerospace applications. For example, the teachings presented herein are expected to find utility in connection with parts and components used on re-entry vehicles and hypersonic vehicles such as in manufacturing heat shields, body structural or leading-edge material materials/components. Optical mounting fixtures for high precision optics such as, but not limited to, satellite optics are also expected to benefit from the teachings of the present disclosure, as are ultra-low outgassing structural components for clean environments such as laser systems or space optics applications.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A feedstock for performing additive manufacturing through a heated extrusion print nozzle heated to a working printing temperature, the feedstock comprising:

a glass matrix flowable through the heated extrusion print nozzle, and meltable at the working printing temperature to enable leaving the heated extrusion print nozzle as a flowable bead onto a build plate; and a reinforcing fiber component disposed within the glass matrix, selected to be at least one of thermally stable or thermally oxidatively stable at the working printing temperature being used to melt the glass matrix; and wherein the reinforcing fiber component is of a volume fraction such that during an extrusion operation the reinforcing fiber component is constrained within the glass matrix and preferentially aligns in a direction of extrusion while forming a structure on a build plate; and wherein the reinforcing fiber component comprises at least one of a tape of one or more continuous reinforcing fibers, a tow of one or more continuous reinforcing fibers, a braid of continuous reinforcing fibers, or a combination of two or more of continuous tape, tow, and braid reinforcing fibers.

2. The feedstock of claim 1, wherein the glass matrix comprises glass powder which is at least one of stabilized or partially consolidated with a quantity of organic binder in a range of between 3.0%-20% by volume.

3. The feedstock of claim 2, wherein the binder is reactive to at least one of temperature or UV light to enable gelation of the structure on printing.

4. The feedstock of claim 2, wherein the binder at least one of burns out or condenses to form at least one of additional glass or ceramic-phase during thermal post-processing operations.

5. The feedstock of claim 1, wherein the glass matrix comprises an inorganic silica-based glass composition including at least one of:

soda-lime glass; or borosilicate glass including at least one of e-glass, s-glass, m-glass or pure quartz glass.

6. The feedstock of claim 1, wherein the glass matrix comprises a glass matrix which has been toughened by an ion exchange process.

7. The feedstock of claim 1, wherein the glass matrix comprises glass powder at least one of stabilized or partially consolidated with polyolefin.

8. The feedstock of claim 1, wherein the glass matrix comprises glass powder at least one of stabilized or partially consolidated with sodium metasilicate.

9. The feedstock of claim 1, wherein the glass matrix includes at least one of:

a flowing agent to enhance flow; or an anti-clumping agent.

10. The feedstock of claim 1, wherein:

the glass matrix includes at least one of nano filler additives or micro filler additives; and wherein the at least one of nano filler additives or micro filler additives includes at least one of:

SiC nanowhiskers;

BN nanofibers;

ceramic hollow spheres; or diamond grit microparticles.

11. The feedstock of claim 1, wherein a fiber volume fraction comprises between 0 and 60% by volume of the feedstock.

12. A system for additive manufacturing, comprising:

at least one of a computer or electronic controller;

a memory in communication with the computer/electronic controller for storing code in accordance with a 3D part design file needed to build a part in a layer-by-layer fashion;

a reservoir;

a feedstock including:

a quantity of a flowable glass matrix in one of a powdered form, a slurry or a paste, contained in the reservoir; and a reinforcing fiber component at least one of mixed in with, or entrained in, the quantity of flowable glass matrix;

the reinforcing fiber component comprising at least one of a tape of continuous reinforcing fiber or fibers, a tow of continuous reinforcing fibers or fiber, a braid of continuous reinforcing fibers, or a combination of two or more of tape, tow and braid continuous reinforcing fibers;

a print nozzle;

a heater configured to heat the print nozzle and the feedstock, such that the feedstock is heated to a working temperature sufficient to melt the glass matrix and form a melted feedstock mixture, and wherein the reinforcing fiber component is thermally stable at the working temperature;

the print nozzle configured to receive the melted feedstock mixture of flowable glass matrix with the reinforcing fiber component and to extrude a bead of melted feedstock onto at least one of a substrate or build plate in accordance with the code;

a nozzle diameter and taper of the print nozzle is such that the reinforcing fiber component aligns in the extruded bead from the print nozzle in a direction of extrusion;

a motion control subsystem configured to move at least one of the print nozzle, the substrate or the build plate as needed to lay a plurality of the beads of melted feedstock down to form each layer of the part in a layer-by-layer fashion.

13. The system of claim 12, further comprising a ram for forcing the feedstock into the print nozzle.

14. A system for additive manufacturing, comprising:

at least one of a computer or electronic controller;

a memory in communication with the computer/electronic controller for storing code in accordance with a 3D part design file needed to build a part in a layer-by-layer fashion;

a feedstock including a consolidated filament of glass and a fiber reinforcing component;

the fiber reinforcing component comprising at least one of a tape of continuous reinforcing fiber or fibers, a tow of continuous reinforcing fibers or fiber, a braid of continuous reinforcing fibers, or a combination of two or more of tape, tow and braid continuous reinforcing fibers;

a support component for supporting the feedstock in a manner such that the feedstock can be withdrawn from the support component;

a print nozzle;

a heater for heating the print nozzle and the feedstock, such that the feedstock is heated to a working temperature sufficient to melt the consolidated filament of glass as the feedstock passes through the print nozzle to form a flowable glass matrix bead, and wherein the fiber reinforcing component is stable at the working temperature;

the print nozzle configured to receive the flowable glass matrix bead with the fiber reinforcing component mixed therein and to extrude the flowable glass matrix bead of melted feedstock onto at least one of a substrate or build plate in accordance with the code;

a motion control subsystem for moving at least one of the print nozzle, the substrate or the build plate as needed to form each layer of the part in a layer-by-layer fashion; and a light source to at least partially cure the flowable glass matrix bead as the flowable glass matrix bead is deposited on the at least one of a substrate or build plate.

* * * * *